United States Patent
Naffziger et al.

(10) Patent No.: US 8,195,962 B2
(45) Date of Patent: Jun. 5, 2012

(54) METHOD AND APPARATUS FOR REGULATING POWER CONSUMPTION

(75) Inventors: Samuel D. Naffziger, Fort Collins, CO (US); Sebastien J. Nussbaum, Lexington, MA (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 875 days.

(21) Appl. No.: 12/268,531

(22) Filed: Nov. 11, 2008

(65) Prior Publication Data

US 2010/0122101 A1    May 13, 2010

(51) Int. Cl.
*G06F 1/32* (2006.01)
*G06F 1/26* (2006.01)
*G06F 11/30* (2006.01)

(52) U.S. Cl. ............ 713/300; 713/320; 713/340
(58) Field of Classification Search .......... 713/300, 713/320, 340
See application file for complete search history.

(56) References Cited

U.S. PATENT DOCUMENTS

| | | | |
|---|---|---|---|
| 7,102,430 B2 * | 9/2006 | Johnson et al. | 330/149 |
| 7,475,262 B2 * | 1/2009 | Banginwar et al. | 713/300 |
| 7,519,843 B1 | 4/2009 | Buterbaugh et al. | |
| 7,681,054 B2 * | 3/2010 | Ghiasi et al. | 713/320 |
| 2002/0075542 A1 * | 6/2002 | Kumar et al. | 359/135 |

OTHER PUBLICATIONS

Rich McGowen, et al. "Power and Temperature Control on 90MM Titanium Family Processor" IEEE Journal of Solid-State Circuits. Vol. 41. No. 1. January 2006 pp. 229-237.

* cited by examiner

*Primary Examiner* — Mark Rinehart
*Assistant Examiner* — Jeremy S Cerullo
(74) *Attorney, Agent, or Firm* — Meyertons, Hood, Kivlin, Kowert & Goetzel, P.C.; Erik A. Heter (57) ABSTRACT

A method for controlling power consumption while maximizing processor performance. The method includes, for a time interval of operation in a first operational state, determining an amount of power consumed during by one or more cores of a processor, calculating, a power error based on the amount of power consumed in the time interval, obtaining a power error term for the interval by adding the power error to a power error term from a previous time interval, and comparing the power error term to at least a first error threshold. If the power error term is outside a range defined at least in part by the first error threshold, the method exits the first operational state and enters a second operational state. If the power error term is within the range defined at least in part by the first error threshold, operation continues in the first operational state.

20 Claims, 5 Drawing Sheets

METHOD AND APPARATUS FOR REGULATING POWER CONSUMPTION

BACKGROUND OF THE INVENTION

1. Field of the Invention

This invention relates to integrated circuits, and more particularly, the monitoring and control of power consumption by integrated circuits.

2. Description of the Related Art

Microprocessors and other complex integrated circuits consume varying amounts of power during their operation. The amount of power consumed by a microprocessor can vary widely based on factors such as the type of application and its corresponding processing load. For example, applications such a graphic-intensive games or complex mathematical modeling programs may have significantly greater processing loads than applications such as a word processors or web browsers, and thus consume greater amounts of power, while resulting in a greater amount of thermal output from the processor.

Computers and other complex electronic systems are typically designed with thermal and power budgets. Power consumption and thermal output must be held within certain limits. However, power consumption and thermal output maximums are parameters that must be considered in context of system performance requirements. If power and thermal requirements are weighed too heavily in the design of a system, performance targets may become unreachable. Conversely, giving too much weight to performance may result in power and thermal targets to be exceeded.

Since the variance in required processing loads can result in a wide variance power consumption and thermal output, many processors have the capability of making adjustments to operating voltage and operating clock frequency. This allows for control over power consumption and thermal output, and may allow these parameters to meet design requirements.

SUMMARY OF THE INVENTION

A method for controlling power consumption while maximizing processor performance is disclosed. In one embodiment the method includes, for a time interval of operation in a first operational state, determining an amount of power consumed by one or more cores of a processor and calculating, a power error based on the amount of power consumed in the time interval. The method further includes obtaining a power error term for the interval by adding the power error to a power error term from a previous time interval, and comparing the power error term to at least a first error threshold. If the power error term for the time interval is outside a range defined at least in part by the first error threshold, the method exits the first operational state and enters a second operational state. If the power error term for the time interval is within the range defined at least in part by the first error threshold, operation continues in the first operational state, including repeating said determining, said calculating, and said adding for each subsequent time interval of operation.

A processor is also disclosed. The processor includes one or more processor cores and a power control unit. The power control unit is configured to, for a time interval of operation in a first operational state, determine an amount of power consumed during by the one or more processor cores, calculate a power error based on the amount of power consumed in the time interval, add the power error for the time interval to a power error term from a previous time interval, and compare the power error term for the time interval to a first error threshold. The power control unit is further configured to cause the processor to exit the first operational state and enter a second operational state when the power error term for the time interval is outside a range defined at least in part by the first error threshold. If the power error term for the time interval is within the range defined at least in part by the first error threshold, the power control unit is configured to cause the processor to remain in the first operational state.

In some embodiments, only two operational states are present, a high performance state and a low power state. For these embodiments, the first error threshold represents a power error deficit when operating in the high performance state, and a power error surplus when operating in the low power state. These values may be stored in a register, which accumulates the power error deficit or power error surplus over successive time intervals. In this embodiment, when the power error surplus exceeds an error threshold for the low power state, the processor switches operation to the high performance state. In some embodiments, the power error surplus will be aged (reduced in magnitude after a fixed length of time) to avoid thermal issues. Similarly, when the power error deficit exceeds an error threshold for the high performance state, the processor will switch operation to the low power state in this embodiment.

In other embodiments, more than two operational states may be present, including one or more intermediate states (i.e. between the highest performance state and the lowest power state). A register may be used to store a surplus (positive) value or a deficit (negative) value. For each time interval of operation in an intermediate power state, comparisons are made with a surplus error threshold and a deficit error threshold. The surplus and deficit error thresholds define a range. If the comparisons determine that the power error term is within the range defined by the surplus and deficit error thresholds for a given interval, operation continues in the current state. If a comparison for a given time interval determines that the power error term is outside of the range (e.g., exceeds a power error deficit), operation from that state is exited and operation in a new state is entered.

In some embodiments, a residency timer is also included. The residency time may determine the amount of time spent in the present operational state. If a comparison of a power error term for a given time interval is out of the range defined by at least one error threshold (e.g., above a power error surplus), a second comparison is made between the time indicated by the residency timer and a minimum time threshold. If the processor has been operating in the current operational state for at least the minimum time indicated by the minimum time threshold, the processor can switch to a new operational state. Otherwise, the processor may remain in the present operational state. The use of a residency timer and a comparison to a minimum time threshold may ensure that the processor does not change operational states too fast, and/or progress through a number of states too quickly in embodiments having more than two operational states.

Changing operational states may include adjusting a supply voltage, changing a clock frequency, or any other parameter that may be changed to affect performance and/or power consumption. In one embodiment, entering a high performance state from a low power state includes increasing a core supply voltage and/or a core clock frequency. Such parameters may be adjusted by a power control unit that is configured to monitor the power, determine a power error for a given time interval, compute the power error term for the given time interval, and compare the power error term to one or more error thresholds associated with the operational state. The power control unit may also be configured to cause the processor to change operational states based on the comparisons.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION OF THE INVENTION

Figure 1:
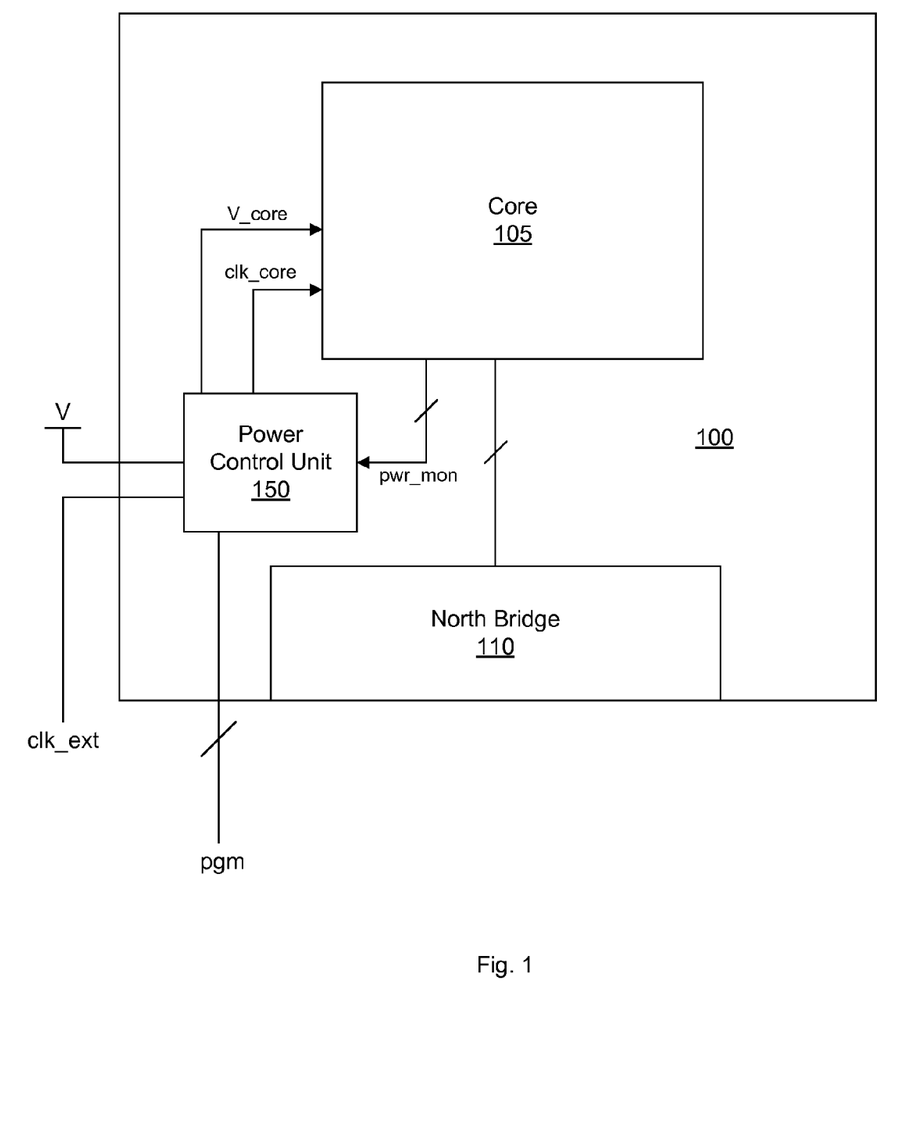
FIG. 1 is a block diagram of one embodiment of a processor having a processor core and a power control unit.

Turning now to FIG. 1, a block diagram of one embodiment of a processor having a processor core and a power control unit is shown. Processor 100 in this embodiment is a microprocessor for a computer system, the microprocessor being implemented on an integrated circuit. However, it should be noted that while the example given herein is directed to a microprocessor for a computer system, the disclosure is not so limited. The method and apparatus for regulating power consumption may be implemented in virtually any type of electronic device having at least one core unit that comprises circuitry (e.g., logic circuitry) to perform its core functions. For example, the method and apparatus could be implemented in a digital signal processing IC, an application specific IC (ASIC), any type of IC configured to transmit, receive, and/or change data from one format to another, and so forth. It is further contemplated herein that the method may be applied to analog electronic devices as well as digital electronic devices.

In the embodiment shown, processor 100 includes a processor core 105, North Bridge 110 and power control unit 150. Processor core 105 includes various logic circuitries such as execution units, cache memories, registers, schedulers, branch prediction and out-of-order execution logic, and so forth. North Bridge 110 is a memory controller hub that provides an interface between processor core 105 and a computer system memory (not shown here), as well as an interface between processor core 105 and a graphics processing unit (also not shown). In some embodiments, the power control unit 150 may be implemented within North Bridge 110.

In the embodiment shown, power control unit 150 is configured to regulate and control power consumption by processor 100. More particularly, power control unit 150 is configured to control the amount of power consumed by processor core 105 in order to keep the average power consumption, over time, within a predetermined limit. In this particular embodiment, power control unit is configured to control power consumption by core 105 by controlling a voltage, controlling a clock frequency, or both. Power control unit is coupled to receive voltage V from a source external to processor 100. Similarly, power control unit is coupled to receive an external clock signal, clk_ext, from a source external to processor 100. In turn, power control unit is coupled to provide a core supply voltage, V_core, and a core clock frequency, clk_core, to processor core 105. Thus, power consumption by processor core 105 may be varied by varying the level of the core supply voltage or the frequency of the clock signal.

Power control unit 150 in the embodiment shown is configured to monitor the power consumed by processor core 105 and to regulate power consumption. In the embodiment shown, one or more signals may be conveyed from processor core 105 to power control unit 150 via a power monitoring bus, pwr_mon. The signals conveyed may include indications of various operating parameters of processor core 105. Such parameters may include, but are not limited to, processor core temperature, current consumption, processing load, bus activity (i.e. activity between North Bridge 110 and processor core 105) and so forth. Based on one or more of these parameters, power control unit 150 may adjust the core supply voltage or the frequency of the core clock signal in order to control the power consumption of core 105, with the goal of balancing power consumption with processor performance.

In the embodiment shown, power control unit 150 is further coupled to receive external signals for programming its operation (via the signal lines labeled 'pgm'). Through this external connection, power control unit 150 can be programmed with various limits for switching between power states, and further, with direction as to what action or actions are to be taken when switching between states (e.g., changing clock frequency, changing voltage, etc.).

In balancing core power consumption with processor performance, power control unit 150 may be configured to cause processor 100 to operate in various power states. In one embodiment, power control unit 150 may cause processor 100 to alternate between operating in a high performance state and a low power state. In the high performance state, the core voltage and/or the clock frequency may be set by power control unit 150 to their maximum rated values. In the low power state, at least one (if not both) of the core voltage and core clock frequency may operate at a reduced value.

Figure 2:
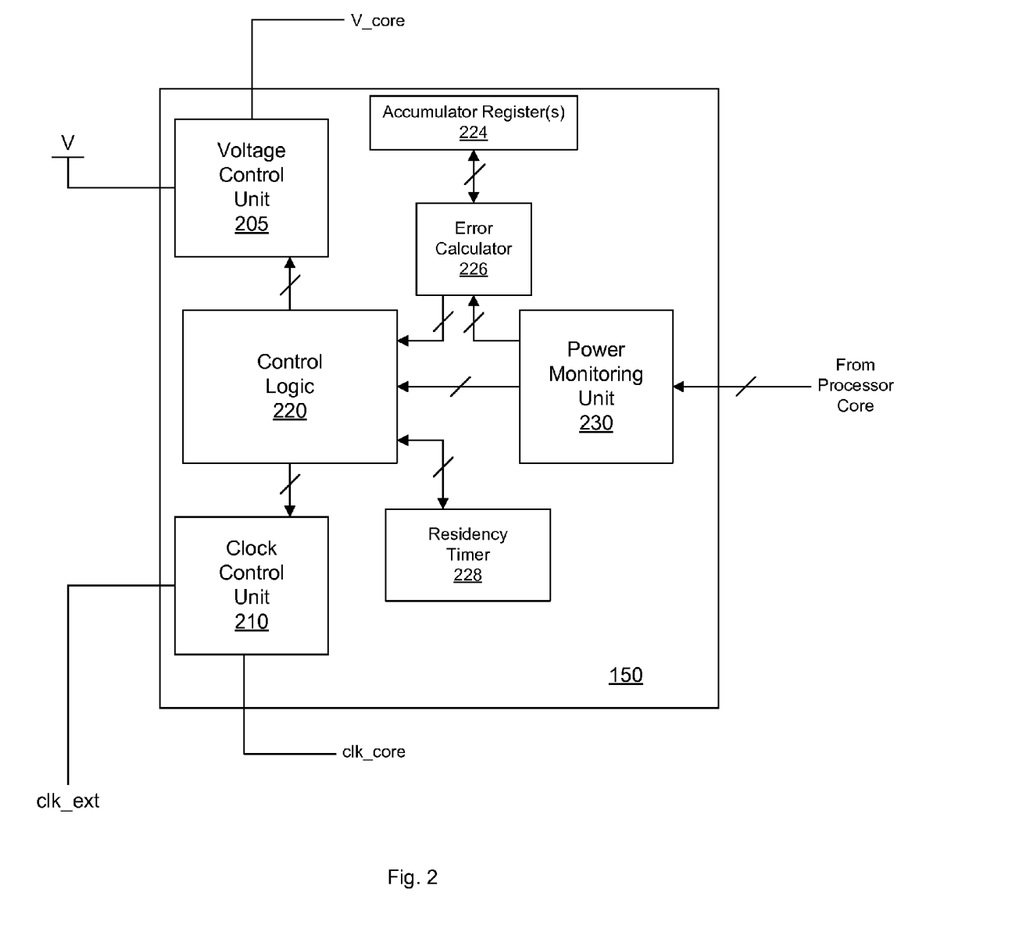
FIG. 2 is a block diagram of one embodiment of a power control unit.

FIG. 2 is a block diagram of one embodiment of a power control unit 150. In the embodiment shown, power control unit 150 includes a voltage control unit 205, a clock control unit 210, control logic 220, an accumulator register 224, an error calculator 226, a residency timer 228, and a power monitoring unit 230.

Power monitoring unit 230 is coupled to receive one or more signals from processor core 105. These signals may provide information indicative of the amount of power consumed by the core. For example, as noted above, the signals may include information regarding processor core temperature, current consumption, processing load, or any other information that may be indicative of power consumption by processor core 105. Power monitoring unit 230 may analyze this information in a manner that indicates power consumption over time intervals. For example, power monitoring unit 230 may determine the amount of current (e.g., total or average) consumed by processor core 105 over an interval of 1 millisecond. This may be repeated for each consecutive time interval that occurs during operation of the processor. This information is then reported to control logic 220 by power monitoring unit 230.

Error calculator 226 is coupled to receive the interval power value (i.e. the power consumed for a given time interval) from power monitoring unit 230. Using this value, error calculator may perform calculations which can be used to determine if power control actions are necessary. The first of these calculations is the determination of an interval power error by subtracting the interval power from a power threshold for that operational state. The value obtained from the subtraction operation may then be added to a power error threshold value that is stored in accumulator register 224. The power error threshold may represent a power error deficit or surplus that has been accumulated over one or more time intervals. When error calculator performs the addition of the power error term and the interval power error, it is thus calculating a new power error term. This new power error term is stored in accumulator register 224 and is used for a similar calculation in the next interval. The power error term may represent an accumulated power error, which may be a deficit or a surplus.

In addition to being stored in accumulator register 224, the power error term calculated by error calculator 226 is also provided to control logic 220, which, in this embodiment is configured to determine whether a power control action is necessary based on the reported power consumption. Control logic 220 may include various hardwired logic circuits, firmware, and/or other necessary circuitry in order to implement the functions provided therein. These functions include performance of a power control algorithm which results in power control unit 150 changing operating states based on the reported power consumption. In an embodiment having only two operating states (a high performance state and a low power state), control logic 220 is configured to determine which of these is the proper operating state based on both present and past power consumption. In some embodiments, control logic 220 may be configured to implement an algorithm to determine one of more than two operating states. Implementing two operational states may provide the simplest algorithm and thus reduce the complexity of control logic 220. However, while embodiments implementing more than two operational states may require more complexity, a finer degree of control for balancing power consumption and performance of the processor may be possible.

In one embodiment, an algorithm for determining an operating state of processor 100 includes comparing the power error term with at least one error threshold. If processor 100 is operating in a high performance state, the error threshold may represent a power error deficit, and if this deficit is exceeded, a change of operational states may occur. If processor 100 is operating in a low power state, the error threshold may represent a power error surplus, which, if exceeded, may also cause a change in operational states. If processor 100 is operating in an intermediate state (e.g., one or one or more states between a high performance state and a low power state), comparisons of a value stored in register 224 to two different error thresholds may be performed by control logic 220. If one of these values is exceeded (i.e. the power error term is outside the range defined by the error thresholds), processor 100 may enter another operational state. If the power error term is within this range (e.g., neither a power error surplus nor a power error deficit threshold is exceeded), operation of processor 100 can continue in the present state. Various embodiments of algorithms for determining a processor operating state will be discussed in further detail below.

In the embodiment shown, power control unit 150 includes a residency timer 228 coupled to control logic 220. When first entering an operational state, control logic 220 may reset residency timer 228 to zero. After the reset, residency timer 228 may begin tolling the amount of time spent in the present operational state. If the compare operation of the power error term to one or more error thresholds indicates an out of range comparison (i.e., a power error surplus or power error deficit has been exceeded), control logic 220 may compare the amount of time tolled by residency timer 228 to a minimum residency time. If the amount of time spent in the present operational state exceeds the minimum residency time, control logic 220 may cause processor 100 to change operational states. However, if the minimum residency time has not been exceeded, then control logic 220 may cause processor 100 to continue operation in the present operational state for at least one more time interval. Thus, the use of residency timer 228 and the compare operation based on minimum residency time may prevent processor 100 from rapidly changing states in a manner that might otherwise cause unstable operation.

Control logic 220 in the embodiment shown is coupled to both a voltage control unit 205 and a clock control unit 210. Control of the operating state of processor 100 may be accomplished by control logic 220 through manipulating one or both of a core supply voltage (V_core) or the frequency of a core clock signal (clk_core). Control logic 220 may alter the operating state of processor 100 between the low power state by directing voltage control unit 205 to change the core supply voltage provided to processor core 105. Voltage control unit 205 may be implemented using adjustable voltage regulator circuitry, level shifter circuitry, or any other suitable circuitry configured to vary a supply voltage. An external voltage V may be received by voltage control unit 205 from a power supply via a motherboard to which processor 100 may be coupled. In one embodiment, control logic 220 may provide signals to voltage control unit 205 that cause processor 100 to enter the low power state by reducing the core supply voltage, and may cause processor 100 to enter the high performance state by increasing the core supply voltage.

Clock control unit 210 may be implemented using a phase locked loop (PLL), a delay locked loop (DLL), or other type of circuitry that can be used for adjusting the frequency of a clock signal. In the embodiment shown, an external clock signal, clk_ext, is provided at a first frequency to clock control unit 210. A core clock signal, clk_core, is provided by clock control unit 210 to processor core 105. Clock control unit 210 is configured to vary the frequency of the core clock signal based on signals received from control logic 220. In one embodiment, control logic 220 may cause processor 100 to enter the low power state by directing clock control unit 210 to reduce the frequency of the core clock signal, and may cause the processor 100 to enter the high performance state by directing clock control unit to increase the frequency of the core clock signal.

It should be noted that embodiments of power control unit 150 having only one of a voltage control unit 205 or clock control unit 210 are possible and contemplated. Furthermore, embodiments of a power control unit 150 are also possible and contemplated wherein entering the high performance state includes increasing both the core supply voltage and the core clock frequency, and correspondingly, leaving the high performance state includes reducing the core supply voltage and core clock frequency.

Figure 3:
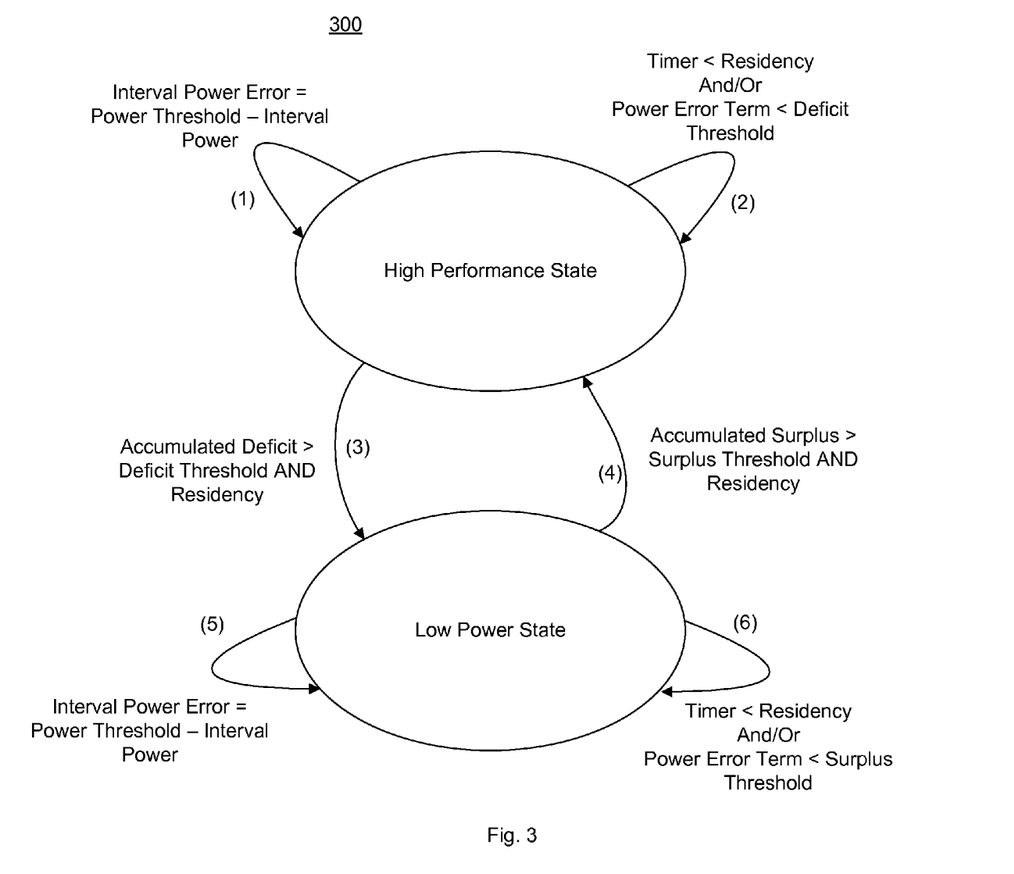
FIG. 3 is a state diagram illustrating operation of one embodiment of a power control unit.

Turning now to FIG. 3, a state diagram illustrating operation of one embodiment the power control unit is shown. More particularly, state diagram 300 illustrates operation of an embodiment of a power control unit 150 configured to switch the operation of processor 100 between a high performance state and a low power state.

When operating in the high performance state in this embodiment, an interval power error is computed for each time interval of operation therein (arrow 1). This may be accomplished by determining the difference between the power consumed during the interval and a power threshold for that particular state. It should be noted that the difference may be a signed value, and thus may be negative. The interval power error is then added to a power error term to obtain a new power error term, which may be stored in a register or other type of suitable memory (e.g. such as register 224 discussed above). Typically, when operating in the high performance state, the power error term represents an accumulated power deficit. For example, in a first interval, an interval power error may be −2 (indicating that the power consumed exceeded the power threshold by a value of 2), and may be stored as the power error term. In the next interval, if the interval power error is −3, it is added to the power error term, resulting in a value of −5, which then becomes the new power error term. Thus, the deficit may accumulate from one interval to the next when operating in the high performance state.

For each interval of operation in the high performance state of this embodiment, the power error term is compared to a deficit threshold, and a separate comparison may be made between a minimum residency time value and the amount of time spent in the high performance state (arrow 2). If the power error term does not exceed the deficit threshold, operation continues in the high performance state. If the power error term does exceed the deficit threshold (e.g., power error term=−11, deficit threshold=−10), then a determination is made as to whether the residency requirements have been met. If the minimum residency requirement has not been met, operation continues in the high performance state. A minimum residency requirement may be a requirement indicating an amount of time that must be spent in a given operational state before shifting operation to another state. Various embodiments may utilize residency requirements to further enhance stability of operation by preventing rapid switching between operational states.

If the power error term exceeds the deficit threshold and the minimum residency requirements have been met, operation shifts from the high performance state to the low power state (arrow 3). Similar to when operating in the high performance state, the interval power is compared to a power threshold for that state (arrow 5) to produce an interval power error. The interval power error is then added to the power error term to obtain a new power error term. It should be noted that in this particular example, the interval power error for the first interval of operation in the low performance state (after shifting from the high performance state) is added to the power error term from the last interval in the high performance state.

When operating in the low performance state, the power error term typically represents an accumulated power error surplus. The interval power error may be added to the power error term for each interval of operation in a manner similar to that for the accumulated power error deficit. However, in this particular embodiment, whereas the power error deficit typically accumulates in the negative direction, the power error surplus will typically accumulate in the positive direction. For a given interval of operation, when the power error surplus does not exceed the surplus threshold for that state, operation will continue in the low power state for the next time interval. If the power error surplus does exceed the surplus threshold, but minimum residency requirements are not met, operation may also continue in the low power state for the next time interval. However, if the power error term exceeds the surplus error threshold and the minimum residency requirements have been met, operation will then shift back to the high performance state (arrow 4).

Broadly speaking, one embodiment of the method described herein is implemented such that, over a number of intervals of operation in either one of the states, a condition will eventually be produced that causes operation to shift to the other state. This may be accomplished by accumulating a power error or a power deficit. In the high performance state, a power error deficit may be accumulated, and when the power error deficit exceeds a deficit threshold for the high performance state, operation may shift to the low power state. In the low power state, this may be accomplished by accumulating a power error surplus, and when the power error surplus eventually exceeds a surplus threshold for the low power state, operation may shift to the high performance state.

Alternating between the high performance state and the low power state may essentially result in the processor operating at a virtual operating point between these two states. The virtual operating point may be set to emphasize performance, emphasize power conservation, or to strike a balance between these two factors. The virtual operating point can be determined by choosing the maximum value for the first error term, as well as the value for the second error term. These terms may be set and locked into place permanently, or may be adjustable over the life of the processor in which they are implemented. As noted in reference to FIG. 1, an external connection ('pgm') may provide access for programming information into power control unit 150, including the information regarding the maximum value of the first power error term and the second power error term.

In the embodiments discussed in reference to FIG. 3, only two operational states are implemented. This may result in a simpler implementation. However, it may be desirable in some embodiments to implement one or more intermediate states between the high performance state and the low power state. Table 1 below illustrates an example of one such embodiment.

TABLE 1

| State | Clock Frequency/Supply Voltage |
|---|---|
| High Performance | High/High |
| Intermediate High | High/Medium |
| Intermediate Low | Medium/Low |
| Low Power | Low/Low |

In the embodiment illustrated by Table 1, four different operational states are implemented, including a high performance state, a low power state, and two intermediate states. The states in this example are defined by the clock frequency and the core supply voltage, each of which may be adjusted from one state to the next. In providing such an implementation, additional error thresholds (for comparisons with a computed power error term) and different power thresholds (for interval error calculations) may be used. Comparisons in the intermediate states may be performed for multiple error thresholds to determine whether the power error term exceeds one of a power error deficit value or a power error threshold value. The number of intermediate states that may be implemented in such an embodiment is limited only by the amount of complexity that is acceptable to the designer. A simple two state embodiment as previously discussed, is the simplest. Embodiments utilizing more than two states may provide a finer grained control of power consumption and the balance with desired performance, but at the cost of increased complexity. Regardless of the number of operational states of a particular embodiment, a virtual operation point may be set based on the various thresholds that are used for power surplus/deficit calculations and those that are used as the basis of comparison in order to determine whether to remain in the same operational state or switch to a new one.

Figure 4:
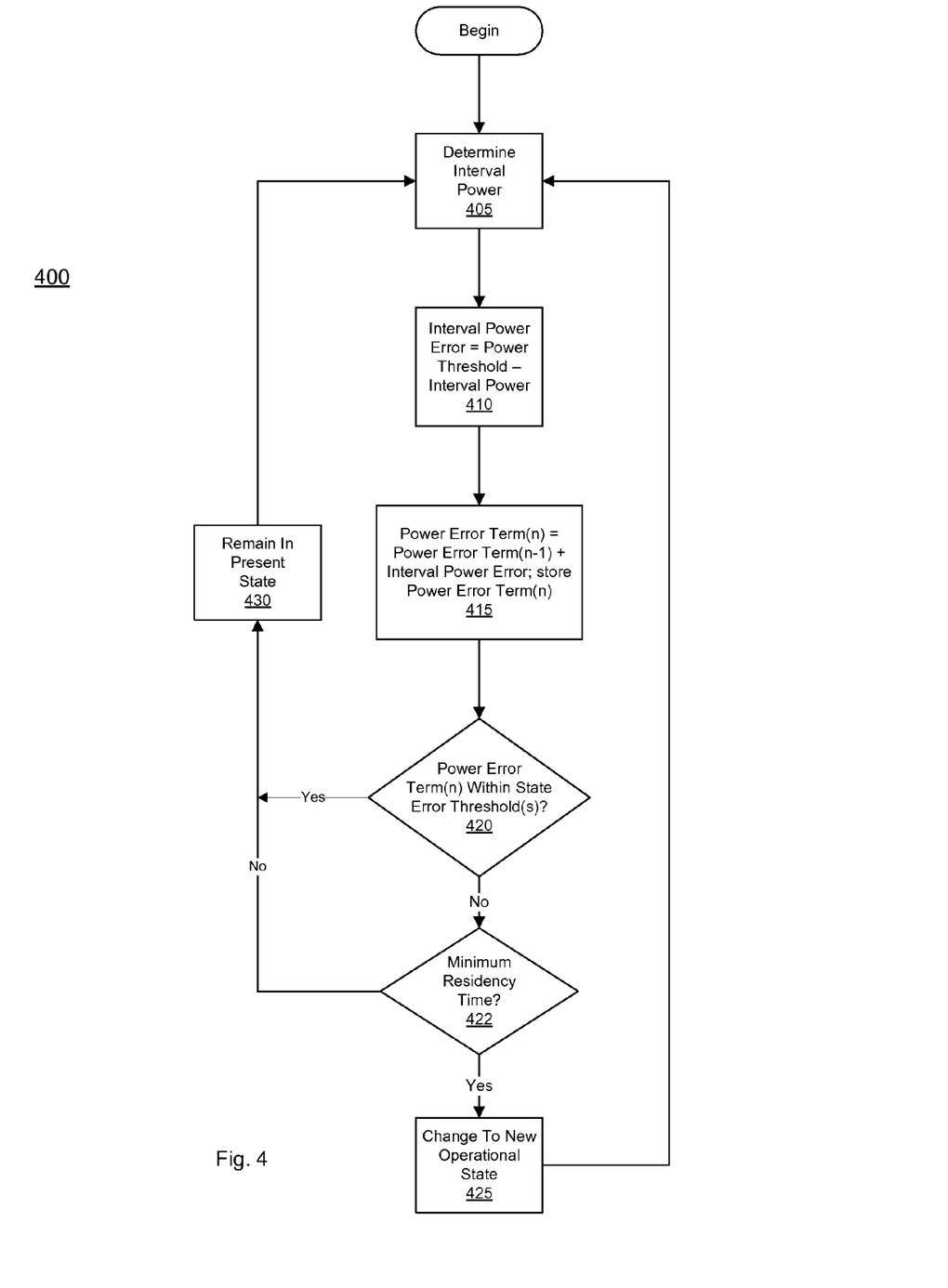
FIG. 4 is a flow diagram of one embodiment of a method of controlling power consumption by a processor.

FIG. 4 is a flow diagram of one embodiment of a method of controlling power consumption by a processor. In the embodiment shown, method 400 begins with the determination of the power consumed for a time interval of operation in the current operational state (405). The current state may be one of a high performance state (highest performance with highest average power consumption), a low power state (lowest power consumption among the states, with less performance than others), or one or more intermediate operating states in embodiments that have more than two. After determining the power consumption for that time interval (i.e. 'interval power'), an interval power error is computed by determining the difference between the interval power and a power threshold (410). Each operational state may have an associated power threshold, which may be different from power thresholds for other operational state. A power threshold may be a positive number, a negative number, or may be zero. The interval power error may be a signed value, and may represent a power error surplus or a power error deficit for that time interval. For example, if the power threshold for a given operational state is 5, and the power consumed in the interval is 7, the difference is −2, i.e. a deficit of −2 for that particular interval. In another example, if the power consumed in an interval is 4, and the power threshold for the operational state is 5, the difference is +1, i.e. a power surplus of 1 for that particular interval.

Next, the interval power error is used to compute a power error term (415). More particularly, the interval power error is added to a power error term from a previous time interval to obtain a power error term for the present time interval. This power error term may be stored in a register, and like the interval power error, may be a signed value. In general, for each time interval the current power term is calculated by adding the interval power error to the power error term for the previous time interval, i.e. power error term (n)=power error term (n−1)+interval power error (n). Thus, the power error term is a cumulative value, which can represent a power error deficit or a power error surplus that has been accumulated over one or more time intervals. Furthermore, the power error term may be carried into subsequent operational states. Thus, if an accumulated power error deficit causes operation to switch to a lower power state, the power error term indicating the accumulated power error deficit will be the power error term for the first interval of operation in the lower power state.

As an example, consider a situation wherein the processor is operating in a high performance state, with the power error term starting at a value of zero. In a first interval, the interval power error may be −2, which is stored into the register as the power error term (since the initial value was 0). In the next interval, the interval power error may be a −4, which is added to the power error term computed in the previous interval to obtain a value of −6, which is thus stored as the power error term. In the next interval after that, the interval power error may be −5, which is added to the power error term of −6 to produce a new power error term of −11.

Next consider a situation wherein operation of the processor has shifted from the high performance state as discussed in the previous paragraph, wherein the processor shifted into the low power state with a power error term having a value of −11. In the first interval of operation, the interval power error may be 4, which is added to the power error term of −11 to produce a new power error term of −7. In a next interval, the interval power error may have a value of 9, which is added to −7 to produce a value of 2. In the next interval following that, the error term may have a value of 9, which is added to the power error term value of 2 to produce a new power error term having a value of 11. Thus, from these examples it can be seen that the power error term represents a cumulative power error term that in this embodiment may rise (e.g., when a power error surplus is accumulated) or fall (e.g., when a power error deficit is accumulated).

In some embodiments, a power surplus may be "aged" in order to avoid thermal issues. This may be accomplished by dividing a power surplus by a factor of N (e.g., N=2) during successive intervals, or subtracting a certain value during successive intervals. Aging a power surplus causes the surplus to diminish over time, and may avoid a thermal hot spot problem caused by consuming a huge power surplus that causes a transition to a higher performance state long after that surplus was actually accumulated. Thus, delaying transition to a higher performance state may allow more time for the processor to cool and may prevent thermal hot spots from developing.

After computing the power error term for the current interval, one or more comparisons between one or more error thresholds and the power error term are made (420). If the comparison indicates that the power error term for a given interval is within a range defined by one or more error thresholds (420, yes), operation continues in the present operational state (430). If the comparison indicates that the power error term for a given interval is not within the range defined by one or more error thresholds (420, no), a comparison is made to determine if minimum residency time requirements have been established (422). The minimum residency time may be used in some embodiments to prevent the processor from changing states too fast, which could possibly cause instability problems. Accordingly, in embodiments having a minimum residency requirement, a residency timer is reset upon entry into an operational state, and subsequent residency requirement comparisons are conducted by comparing the value indicated by the residency timer to a minimum residency time. If the minimum residency requirements have not been met (422, no), operation continues in the present operational state (430). If the residency requirements have been met (422, yes), the processor exits the current operational state and enters a new operational state (425).

In one embodiment, if operating in a high performance state (i.e. an operational state intended to maximize processor performance, at the expense of greater power consumption), only a single comparison need be made, between a power error deficit and a error threshold for that state. If the power error deficit exceeds the error threshold for the high performance state, operation in that state is exited and operation commences in a lower performance operational state. As previously noted, the interval power error may be a signed term, and thus the power error term for a given time interval may also be a signed term. A power error deficit may be represented by a negative number (e.g., −10), while a power error surplus may be represented by a positive number. Thus, if the power error term is −11, the power error deficit thus exceeds the error threshold in this example, thereby causing an exit from the high performance state to a lower power state (assuming residency requirements are met). If the power error term is −9, −8, −7, etc., the power error term does not exceed the error threshold in this example, and operation continues in the high performance state.

In another example of the comparison operation, the processor may be operating in a low power state (i.e. an operational state intended to conserve power and/or reduce thermal output, at the expense of performance). When operating in the low power state, the interval power error and the power error terms may indicate a power error surplus. The error threshold for the low power state may indicate a surplus value in which the state is to be exited and operation commenced in a higher performance state. For example, if the error threshold for the low power state is 10, and the power error term for a given time interval is 8, then operation continues in the low power state. If, in the next time interval, the power error term is 10 or greater, the processor may exit the low power state and move to a higher performance state if residency requirements have also been met.

In yet another example of the comparison operation, the processor may be operating in an intermediate state, which is neither the highest performance state nor the lowest power state. The power error term for a given time interval may be compared to both a first error threshold and a second error threshold. The first error threshold may be used to determine if the power error term exceeds a power error surplus, while the second error threshold may be used to determine if the power error term exceeds a power error deficit. In effect, the first and second terms define a range of values. If the power error term is within the range defined by these values, operation in the next time interval will be in the same state as the current time interval. If the power error term is outside of this range, and residency requirements have been met, operation may shift to a higher performance state or a lower power state, depending on where the excess occurred. Consider a situation where the first error threshold is 10 and the second error threshold is −10. If a power error term indicates an accumulated power surplus of 10 or greater, operation will be shifted from the present operational state to a higher performance state if residency requirements have been met. If the power error term indicates an accumulated power error deficit of −10 or greater (greater being −11, −12, −13, and so on), then operation will be shifted from the present operational state to a lower power state, assuming residency requirements have been met. If the accumulated power error term is between these values (e.g., −9, 0, 7, etc.), the operation in the next time interval will be in the same state as in the current time interval.

Figure 5:
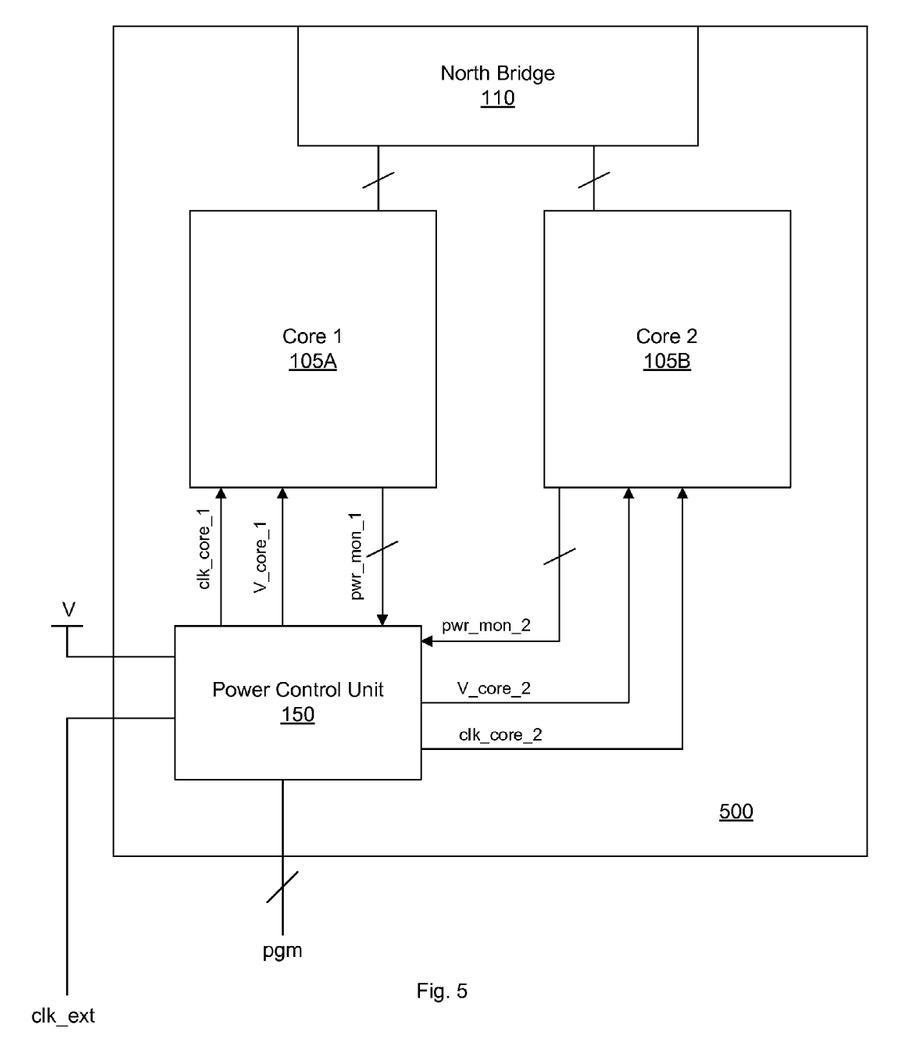
FIG. 5 is a block diagram of one embodiment of a processor having a power control unit and a plurality of processor cores.

Turning now to FIG. 5, a block diagram of one embodiment of a processor having a power control unit and a plurality of processor cores is shown. In the embodiment shown, processor 500 is a dual core processor, having a first core 105A and a second core 105B. Processor 500 also includes a north bridge unit 110 and a power control unit 150, both of which are coupled to both processor cores 105A and 105B. Power control unit 150 is configured to monitor the power of both processor cores 105A and 105B, and configured to alternate operation of these cores between at least a high performance state and a low power state. As noted above, additional, intermediate operational states may be implemented. Power control unit 150 may accomplish the switching between operational states of processor cores 105A and 105B by changing the frequency of clock signals provided to the cores, changing supply voltages provided to the cores, or both.

In some embodiments, the operational state of cores 105A and 105B are in conjunction with each other. That is, both processor cores 105A and 105B are operated in the same state. However, embodiments are possible and contemplated wherein the operational states of processor cores 105A and 105B may be controlled independently of one another. For example, in such an embodiment, processor core 105A may operate in the high performance state, while processor core 105B operates in the low power state. Such a configuration may require that cores 105A and 105B have separate, independent core supply voltage planes and/or are configured to receive separate, independently controlled core clock signals. In addition, embodiments are possible and contemplated wherein power control unit 150 is configured to monitor the processing workloads of each processor core 105A and 105B, and may change operational states of the cores by changing their respective processing workloads.

Another embodiment is contemplated wherein a multi-core processor includes multiple power control units, each of which is associated with a corresponding one of a plurality of processor cores. In such an embodiment, each power control unit may separately control the states of operation of its corresponding core. The power control unit for each core may also monitor power consumption of the processor as a whole, which may be used, along with one or more power error terms, as a basis for determining the operational state of its corresponding processor core.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
for a current time interval of operation in a first operational state, determining an amount of power consumed during by one or more cores of a processor;
calculating, a power error based on the amount of power consumed in the time interval;
obtaining a power error term for the current time interval by adding the power error to a power error term from a previous time interval; and
comparing the power error term for the current time interval to at least a first error threshold;
exiting the first operational state and entering a second operational state if the power error term for the current time interval is outside of a range defined at least in part by the first error threshold;
continuing operation in the first operational state if the power error term for the current time interval is within the range defined at least in part by first error threshold; and
repeating said determining, said calculating, and said adding for each subsequent time interval of operation of the processor.

2. The method as recited in claim 1, wherein said calculating includes subtracting the amount of power consumed from a first power threshold.

3. The method as recited in claim 1, wherein the first operational state is a high performance state, and wherein the second operational state is a low power state.

4. The method as recited in claim 3, further comprising, when operating in said second operational state, performing said determining, said calculating, and said adding, and further comprising comparing the power error term for the current time interval to a second error threshold, wherein the second error threshold represents a power error surplus, and wherein the first error threshold represents a power error deficit.

5. The method as recited in claim 1, wherein the first operational state is one of a high performance state or a low power state, and wherein the second operational state is an intermediate power state.

6. The method as recited in claim 5, further comprising, when operating in said second operational state, performing said determining, said calculating, and said adding, and further comprising comparing the power error term for the current time interval to the first error threshold and a second error threshold, wherein the second error threshold represents a power error surplus, and wherein the first error threshold represents a power error deficit.

7. The method as recited in claim 5, further comprising, subsequent to entering the second operational, comparing an amount of time spent in the second operational state minimum time value; and
preventing the processor from exiting the second operational state if the amount of time spent in the second operational state is less than the minimum time value.

8. The method as recited in claim 1, wherein exiting the first operational state and entering the second operational state includes one or more of the following:
changing a supply voltage provided to each of the one or more cores;
changing a frequency of a clock signal provided to each of the one or more cores.

9. The method as recited in claim 1, further comprising storing the power error term in a register.

10. A processor comprising:
one or more processor cores; and
a power control unit configured to:
for a current time interval of operation in a first operational state, determine an amount of power consumed during by the one or more processor cores;
calculate a power error based on the amount of power consumed in the current time interval;
obtain a power error term for the current time interval by adding the power error to a power error term from a previous time interval; and
compare the power error term for the current time interval to a first error threshold;
wherein the power control unit is further configured to:
cause the processor to exit the first operational state and enter a second operational state if the power error term for the current time interval is outside of a range defined at least in part by the first error threshold; and
cause the processor to continue operation in the first operational state if the power error term for the current time interval within the range defined at least in part by the first error threshold, wherein the power control unit is configured to, for each subsequent interval of operation, repeat said determining, said calculating, said adding, and said repeating.

11. The processor as recited in claim 10, wherein the power control unit is configured to calculate the power error by subtracting the amount of power consumed from a first power threshold.

12. The processor as recited in claim 10, wherein the first operational state is a high performance state, and wherein the second operational state is a low power state.

13. The processor as recited in claim 12, wherein the power control unit is configured to, when the processor is in the second operational state, to perform said determining, said calculating, and said adding, and further configured to compare the power error term for the current time interval to a second error threshold, wherein the second error threshold represents a power error surplus, and wherein the first error threshold represents a power error deficit.

14. The processor as recited in claim 10, wherein the first operational state is one of a high performance state or a low power state, and wherein the second operational state is an intermediate power state.

15. The processor as recited in claim 14, wherein the power control unit is configured to, when the processor is in the second operational state, to perform said determining, said calculating, and said adding, and further configured to compare the power error term for the current time interval to a the first error threshold and a second error threshold, wherein the second error threshold represents a power error surplus, and wherein the first error threshold represents a power error deficit.

16. The processor as recited in claim 14, wherein the power control unit is further configured to subsequent to entering the second operational, compare an amount of time spent in the second operational state minimum time value; and
prevent the processor from exiting the second operational state if the amount of time spent in the second operational state is less than the minimum time value.

17. The processor as recited in claim 10, wherein the power control unit is configured to cause the processor to exit the first operational state and enter the second operational state by performing one or more of the following:
changing a supply voltage provided to each of the one or more processor cores;
changing a frequency of a clock signal provide to each of the one or more processor cores.

18. The processor as recited in claim 10, wherein the power control unit is configured to store the power error term for the current time interval in a register.

19. An apparatus comprising:
first means for determining an amount of power consumed during by one or more cores of a processor during a current time interval of operation in a first operational state of the processor;
second means for calculating a power error based on the amount of power consumed in the current time interval;
third means for computing a power error term for the current time interval by adding the power error to a power error term from a previous time interval;
fourth means for comparing the power error term for the current time interval to a first error threshold;
and fifth means for determining an operational state of the processor for a next time interval, wherein said fifth means causes the processor to exit the first operational state and enter a second operational state if the power error term is outside of a range defined at one end by the first error threshold, and wherein said fifth means causes the processor to continue operation in the first operational state if the power error term is within the range defined at one end by the first error threshold, and wherein said determining, said calculating, said adding, and said comparing is repeated for each subsequent time interval of operation of the processor.

20. The apparatus as recited in claim 19, wherein said calculating includes subtracting the amount of power consumed from a first power threshold.

* * * * *